United States Patent [19]

Alm et al.

[11] 4,304,285

[45] Dec. 8, 1981

[54] WHEEL RESTRAINING MEANS

[75] Inventors: Bernard D. Alm, Willowdale; Leslie Bubik, Toronto, both of Canada

[73] Assignee: FMC Corporation, San Jose, Calif.

[21] Appl. No.: 10,284

[22] Filed: Feb. 7, 1979

[51] Int. Cl.³ .............................................. B60C 25/00
[52] U.S. Cl. ..................................................... 157/14
[58] Field of Search .......................... 157/1.1, 1.33, 1.5, 157/1.28, 14; 144/288 A

[56] References Cited

U.S. PATENT DOCUMENTS

| | | | |
|---|---|---|---|
| 2,233,371 | 2/1941 | Smith | 144/288 A |
| 2,609,039 | 9/1952 | Henderson | 157/1.28 X |
| 3,036,625 | 5/1962 | Penkoff et al. | 144/288 A X |
| 3,774,664 | 11/1973 | Matysak | 157/1.1 |
| 3,783,928 | 1/1974 | Lee | 157/1.1 |

Primary Examiner—W. D. Bray
Attorney, Agent, or Firm—H. M. Stanley

[57] ABSTRACT

A wheel restraining means is provided for use on tire-changing machines and the like which comprises a rigid plate to the underside of which, flexible ring is secured. The ring is urged into pressurable engagement with a wheel to be secured on the machine and to be restrained from vertical movement.

The wheel is secured from lateral movement by a self-locking conical member which engages the lower edge of the wheel hub hole.

2 Claims, 6 Drawing Figures

WHEEL RESTRAINING MEANS

BACKGROUND OF THE INVENTION

Wheel structures, at least in North American model wheels, normally comprises a central hub opening surrounded by a regular arrangement of spaced-apart bolt holes for securement to the axle. Such wheel structures are still the most common.

However, with the advent of magnesium wheels and other more exotic or sophisticated forms of wheels, the structure of wheels has led to the provision of radial reinforcing ribs and the provision of a great variety of bolt hole configurations.

The accommodation and restraining of these latter types of wheels on conventional tire-changing machines has been awkward and time-consuming.

The conventional tire-changing machine has a central post which passes through the central hub hole of the wheel and a second, hinged, pointed shaft which engages a selected one of the bolt holes on the wheel web. A threaded collar mounted on the central post completes the wheel securement.

With the "exotic" wheel forms the securement cannot be effected as with the more common wheel.

At present these "exotic" wheels are secured by means of a plate and pins.

The plate has a central opening which fits over the central post and a plurality of holes therein. These holes are so arranged that they will accommodate the different configurations of bolt holes in the wheels. The operator in using these plates initially mounts the plate on the central post, consults a chart which instructs him as to the appropriate selection of holes for the particular model wheel and aligns the designated holes with bolt holes in accordance with the chart indications. A collar then secures the plate to the central post and a series of pins are passed through the plate to engage the bolt holes in the wheel and restrain the wheel from movement. The collar prevents movement of the wheel rim along or up the post and the pins which extend through the plate to engage the bolt holes restrain the wheel from rotational movement around the post.

SUMMARY OF THE INVENTION

It is the principal object of the present invention to provide a means whereby any wheel having a central hub hole may be accommodated and secured on the shaft of a tire-changing machine or the like with facility, speed and economy.

To accomplish this objective, there is provided in accordance with the present invention wheel-restraining means for use in restraining a tire wheel rim at least relative to one direction on a machine, which machine has a wheel-engaging shaft; said means comprising a rigid plate having an opening therein engageable with said post, a flexible member extending below the underside of said plate; said flexible member having a lower surface engageable with an adjacent surface of a tire wheel, and adjustable locking means engageable with said post and said plate for urging said flexible member into pressure engagement with said wheel to restrain movement in at least one direction between said wheel rim and said machine shaft.

There is also provided a conical member for engagement with the hub hole of the wheel. This conical member is self-locking and has an outer surface inclined to the vertical at an angle whose tangent is substantially equal to the coefficient of friction between the wheel and the cone.

These and other features and objects of the present invention will be more apparent from the following description and drawings in which several embodiments are illustrated by way of example, and in which.

Figure 1:
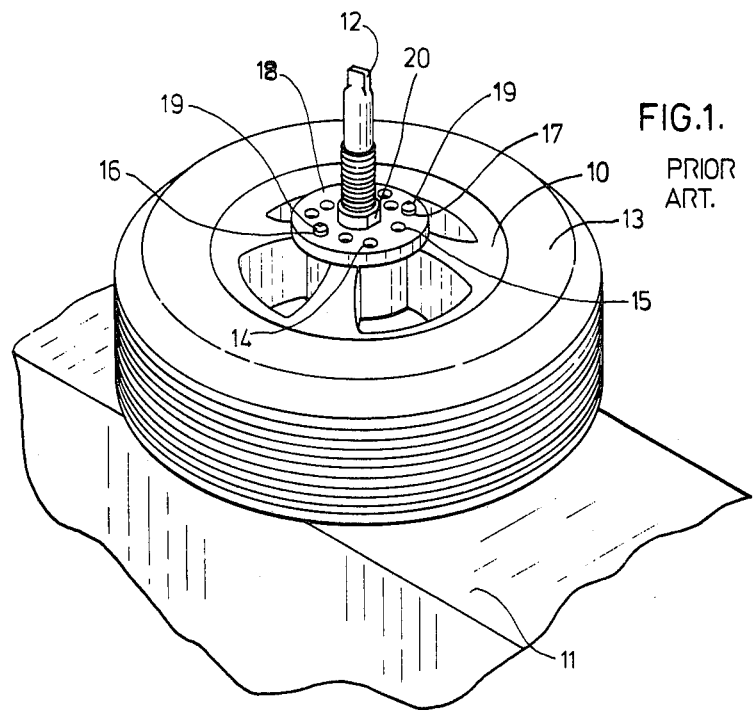
FIG. 1 is a perspective top view of a tire-changing machine with a wheel of the "exotic" type secured in position by means of the apparatus of the prior art.

Referring now to the drawings, in FIG. 1 the tire wheel is generally indicated at 10, the upper visible surface of a tire-changing machine at 11 and the central wheel mounting shaft of a tire-changing machine at 12. The tire is indicated at 13.

When the tire is to be repaired in accordance with the prior art the tire in combination with the wheel rim is mounted on the tire changing machine 11 so that shaft 12 passes therethrough. The operator, since the example shown is a non-conventional wheel structure, then selects a plate such as 18 which is provided with the various holes such as 14, 15, 16 and 17 in the examples shown and secured in position. A collar 20 is then passed over the shaft 12 and made fast through its threaded engagement with the collar.

Figure 2:
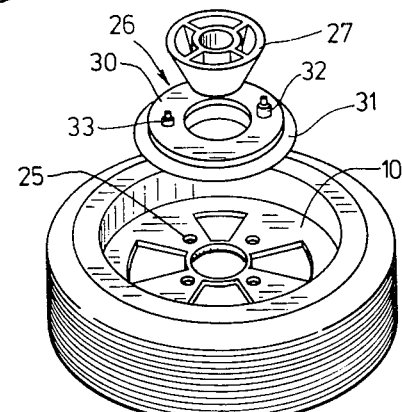
FIG. 2 is an exploded perspective view of one embodiment of the present invention and serves to illustrate its relationship prior to mounting with a tire-changing machine.
Figure 2:
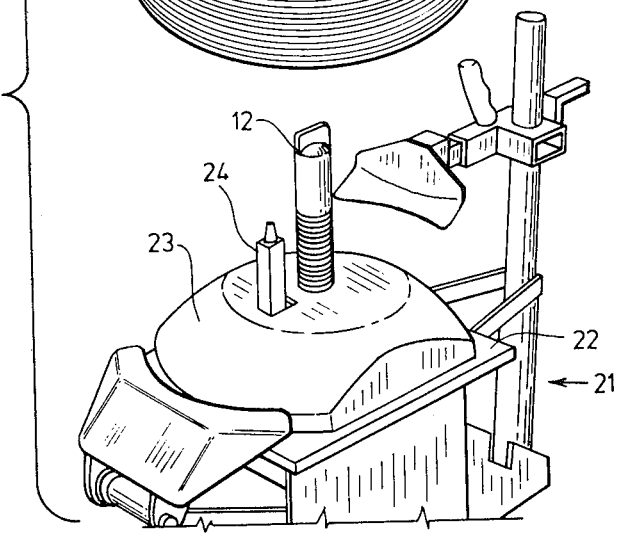

As will be seen, the various arrangements of the holes and the number of operations required to effect securement makes this operation both awkward and time-consuming. In FIG. 2 the upper part of a tire-changing machine is generally indicated at 21 and has a table 22 upon which an arcuate inwardly outwardly sloping surface 23 is provided. Through the upper surface of 23 a central shaft 12 and a pin 24 extend in the manner shown. Pin 24 is so mounted that it may move in a plane towards and away from the central shaft 12. This permits engagement with bolt holes on the wheel hub at various distances from the centre of the wheel hub.

Figure 3:
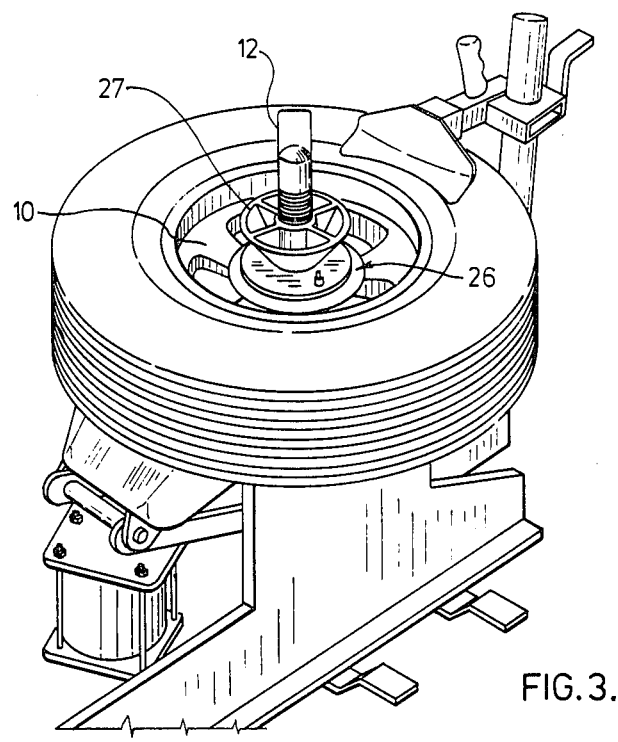
FIG. 3 is a perspective top view of the present invention with the wheel fastening means secured in position.
Figure 4:
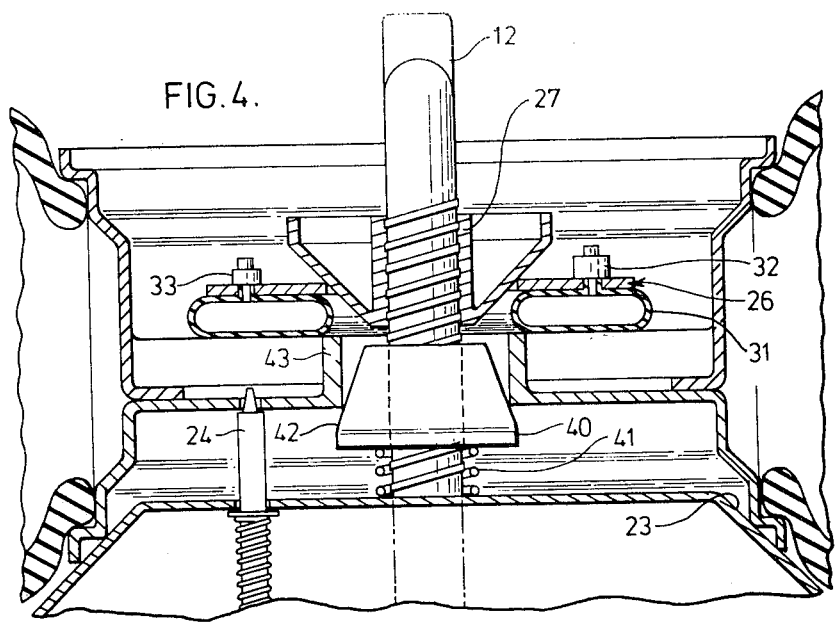
FIG. 4 is a schematic vertical section of the apparatus shown in FIG. 3 with the tire structure omitted for the sake of clarity.

In the embodiments shown in FIGS. 2 through 4 the wheel 10 is dropped over or placed over the central shaft 12 and so arranged that the pin 24 engages one of the bolt holes 25. Over this assembly a wheel fastening mechanism 26 is mounted and a collar 27 is passed over and threadably engaged with shaft 12. As collar 27 is threaded down the outside wall it engages with the inner periphery of the wheel fastening mechanism 26 to be tightly secured in position.

The fastening means 26 comprises an upper rigid plate 30 below which is provided an inflatable bag 31 or a compressible element such as a rubber ring. The inflatable bag 31 is connected through an inflating valve 32 and a pressure relief valve 33 which extend through plate 30. The material of the inflatable bag 31 may be rubber as shown by the hatching of the drawing.

After the mounting sequence previously described has been followed the inflatable bag 31 is inflated from any given source. The pressure relief valve 33 is so set that the pressure exerted by the inflatable bag 31 does not exceed 15 pounds pressure per square inch.

With this arrangement, the wheel is now set and firmly fixed in position so that operations may be carried out on the tire.

FIG. 3 is illustrated as a perspective view from the top of a further embodiment with the wheel fastening means secured in position. In this embodiment the wheel is one of the magnesium wheel structures.

With magnesium wheel structures the central hub hole is relatively weak. In the prior embodiment the cone 27 served to centre the wheel and the wheel fastening means 26. In this embodiment because of the relatively fragile nature of the magnesium wheel hub structure it is necessary that the forces on the wheel be less concentrated.

Figure 5:
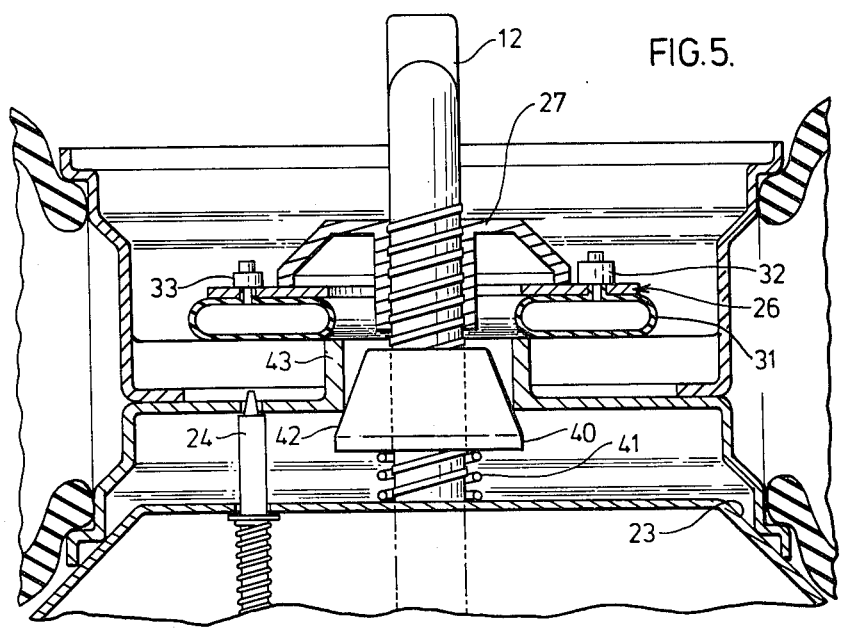
FIG. 5 is a schematic vertical section, similar to FIG. 4, showing an alternate means of securing the wheel to the centre shaft.
Figure 6:
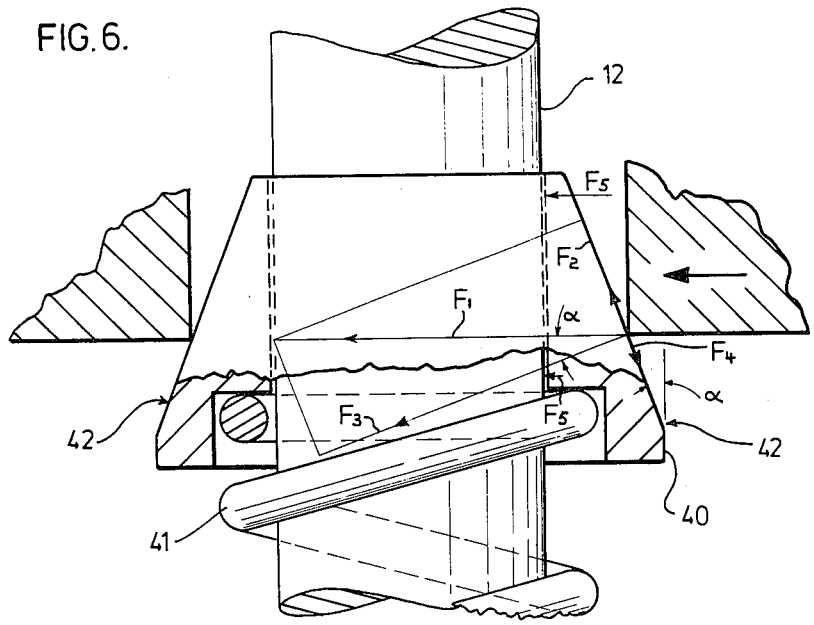
FIG. 6 is an enlarged vertical section of a bottom cone in accordance with the invention and serves to illustrate the force relationship between the wheel rim and the cone.

In the preferred embodiments shown in FIGS. 4 through 6 spring 41 is placed over the centre shaft 12 and then a cone 40 is placed over the spring 41. While shaft 12 may be threaded throughout its length as seen in FIGS. 2, 4 and 5, cone 40 is internally dimensioned to slide freely thereover as urged by spring 41 and as generally indicated in FIG. 6. The wheel 10 is then placed over the shaft so that the pin 24 engages one of the bolt-holes 25. Over this assembly a wheel fastening mechanism 26 is placed so that the compressible element 31 engages the adjacent surfaces of the wheel rim. Cone 27 is then mounted on shaft 12 either with the cone downwards in FIG. 4 or with the apex upwards as in FIG. 5, and the air bag 31 inflated as before.

With apex upwards the force exerted by the cone 27 is more directly downward on the upper surface of the wheel rather than being concentrated on the hub hole where it may damage the periphery.

In the embodiments illustrated in FIGS. 4 through 6 the pin 24 serves to prevent the wheel rim from being rotated; the wheel restraining plate 26 and the cone 27 restrain the wheel from moving vertically; and the cone 40 and spring 41 serve to prevent lateral movement of the wheel.

Cone 40 has side surfaces 42 which make the cone, when seated and engaged with the wheel rim hub hole, self-locking.

Initially, spring 41 urges cone 40 into engagement with the wheel on the shaft. However, when the upper fastening mechanism 26 is secured in position the attitude of the surfaces 42 of the cone 40 engage the hub hole so that there is no lateral movement of the rim. The conical form permits different wheel depths and hub hole sizes to be accommodated. It has been found that the size of the self-locking angle is proportional to the coefficient of friction between the wheel and the cone. This of course will vary according to the materials of the cone and the wheel rim. The angle, which the cone defines with the vertical ideally should be as small as possible.

The cone 40 will accommodate up to 25 different sizes of central hub openings, the present range of hubs. It will, of course, be understood that this number may be varied by lengthing the cone 40. If necessary a second cone of different width or height may be employed.

From the foregoing, it will be seen that a new and simple means of fastening the wheels on shafts for the purposes of repair and adjustment has been provided and the operator can use these means with much greater facility and speed than previously.

However, it has been found, as illustrated by the vectors in FIG. 6;
that the cone will be self locking when:
$F_3 \times Y = F_2$ In FIG. 6 the forces acting on the rim, cone and centre shaft may be regarded as follows:
$F_1$ = horizontal component
$F_2$ = upward component
$F_3$ = component normal to cone surface
$F_4$ = downward component
$F_5$ = force on shaft
$Y$ = coefficient of friction
$X$ = inclination from vertical
It will be seen that when:
$F_3 \times Y = F_2$ the wheel does not move laterally.

It has been found that this condition will be satisifed when:
$X = 15°$.

When the angle is greater than 15° the cone is no longer self-locking, below 15° the cone will be self-locking but the constraints of length with angles of less than 10° make such angles impractical for commercial purposes.

It will of course be apparent that for deeper wheel rims the cone will have to be longer but the slope of the cone will be substantially within the ranges specified for materials currently employed.

I claim:

1. Apparatus restraining movement of a tire wheel rim having a central rim opening surrounding a shaft having external thread-like lands thereon and extending upwardly from a tire changing machine, comprising
    a lower conical member surrounding the shaft and clearing the thread-like lands engageable with the edges of the rim opening and having an outer surface inclined at an angle to the vertical whose tangent is equal to or less than the coefficient of friction between the edges of the wheel rim defining the rim opening and said lower conical member, whereby said lower conical member is freely movable axially on the shaft,
    means for urging said lower conical member into engagement with said rim opening,
    a flexible member adapted to surround the upwardly extending shaft and to engage the upper surface of the tire wheel rim,
    a rigid member contacting the upper side of said flexible member and having a centrally located hole therethrough which receives the upwardly extending shaft,
    and an upper conical member disposed with the base thereof positioned downwardly in contact with said rigid member and having a hole therethrough with internal threads formed therein to fit the thread-like lands on the shaft, said internal threads being engageable with the upwardly extending shaft whereby said upper conical member may be turned on said threads to thereby urge said flexible member into pressure engagement with the upper surface of the tire wheel rim.

2. Wheel restraining means as claimed in claim 1 wherein said conical member has an outer surface inclined to the vertical at an angle in the range 10°-15°.

* * * * *

UNITED STATES PATENT AND TRADEMARK OFFICE
CERTIFICATE OF CORRECTION

PATENT NO. : 4,304,285
DATED : December 8, 1981
INVENTOR(S) : Leslie Bubik

It is certified that error appears in the above—identified patent and that said Letters Patent is hereby corrected as shown below:

On cover page it should be "Inventor:" instead of "Inventors:".

On cover page after "Inventor:" delete Bernard D. Alm, Willowdale.

On cover page after Toronto delete "both of"

In Abstract, line 3 after "which" delete the comma and insert --a--.

Signed and Sealed this

Fifteenth Day of June 1982

[SEAL]

Attest:

GERALD J. MOSSINGHOFF

Attesting Officer

Commissioner of Patents and Trademarks